United States Patent
Knoblauch

(10) Patent No.: US 12,386,817 B2
(45) Date of Patent: Aug. 12, 2025

(54) FAST SWITCHING TO TRANSACTION ENTRY PROGRAM

(71) Applicant: SAP SE, Walldorf (DE)

(72) Inventor: Bernhard Knoblauch, Leimen (DE)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 18/452,906

(22) Filed: Aug. 21, 2023

(65) Prior Publication Data
US 2024/0095235 A1  Mar. 21, 2024

(30) Foreign Application Priority Data

Sep. 20, 2022  (EP) .................................... 22196620

(51) Int. Cl.
*G06F 16/23*  (2019.01)
*H04L 67/02*  (2022.01)
*H04L 67/141*  (2022.01)

(52) U.S. Cl.
CPC .......... *G06F 16/2379* (2019.01); *H04L 67/02* (2013.01); *H04L 67/141* (2013.01)

(58) Field of Classification Search
CPC ... G06F 16/2379; H04L 67/02; H04L 67/141; H04L 67/148
See application file for complete search history.

(56) References Cited

U.S. PATENT DOCUMENTS

| | | | |
|---|---|---|---|
| 2010/0306547 A1* | 12/2010 | Fallows .............. | H04L 63/0815 713/178 |
| 2012/0029983 A1* | 2/2012 | Rodriguez ............. | G06Q 30/02 705/14.4 |
| 2020/0092382 A1* | 3/2020 | Borkar ................. | H04L 67/142 |
| 2020/0145385 A1* | 5/2020 | Chauhan ............. | H04L 63/0281 |

OTHER PUBLICATIONS

"Communication—European Extended Search Report", European Patent Office, Feb. 24, 24 (Feb. 24, 2023), for European Application No. 22196620.3-1213, 10pgs.

* cited by examiner

*Primary Examiner* — Emmanuel L Moise
*Assistant Examiner* — Xiang Yu
(74) *Attorney, Agent, or Firm* — Buckley, Maschoff & Talwalkar LLC

(57) ABSTRACT

Some embodiments are directed to obtaining computer network connection data of the client-side transaction entry program, the computer network connection data allowing a connection to be made with the client-side transaction entry program, receiving a begin transaction message from the client-side computer indicating a request to launch a transaction, the computer network connection data being obtained before receiving the begin transaction message, and setting up a connection between the transaction system and the client-side transaction entry program using the computer network connection data enabling the client-side transaction entry program and the transaction system to cooperate in performing the transaction.

20 Claims, 5 Drawing Sheets

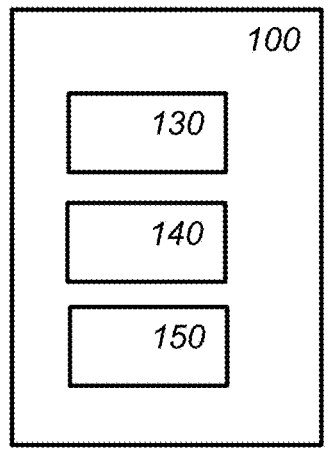 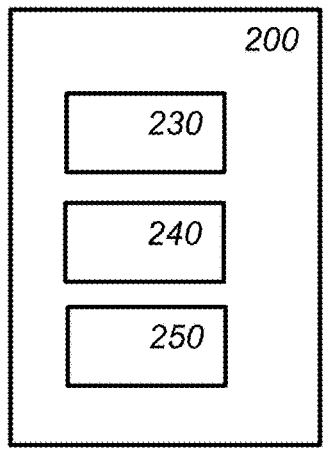 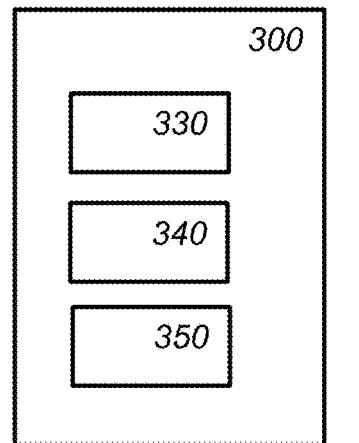
Fig. 1a          Fig. 1b          Fig. 1c
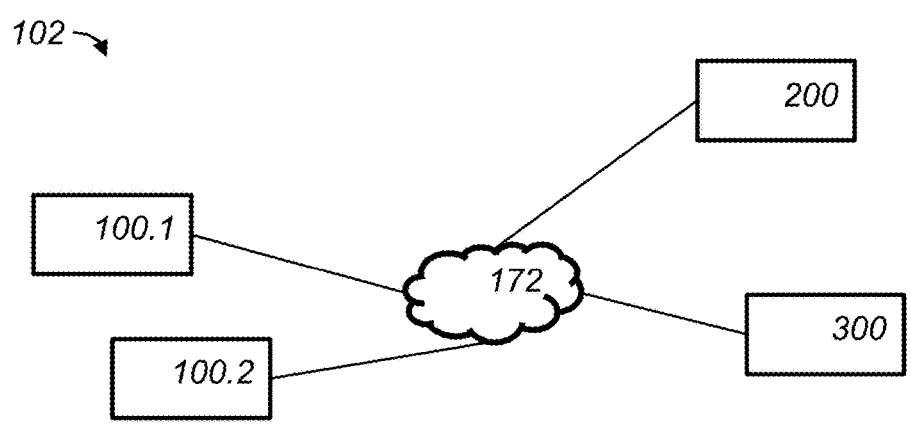
Fig. 2

FAST SWITCHING TO TRANSACTION ENTRY PROGRAM

CROSS-REFERENCE TO RELATED APPLICATIONS

This application claims the benefit of and priority to EP patent application no. 22196620.3, filed Sep. 20, 2022, the entire contents of which are incorporated herein by reference for all purposes.

TECHNICAL FIELD

The presently disclosed subject matter relates to an interface system, a transaction system, a client-side computer, an interface method, and a computer readable medium.

BACKGROUND

In large transaction systems, e.g., database systems, such as SAP systems, clients connect from client-side computers to perform transactions on data managed by the database system. For example, a user may enter new information, locally at his/her computer and send the information over a computer network for processing at the database system. For example, a user may amend or delete information, locally at his/her computer and send the information over a computer network for processing at the database system.

Traditionally, a user would install a transaction entry program at his/her local computer. The transaction entry program makes a connection with the transaction system and provides a user interface. The local transaction entry program and the transaction system would cooperate to ensure information for transactions are entered and then processed accordingly.

Recently, some transaction systems are moving away from dedicated transaction entry programs and instead provide an interface over http. Instead of starting the transaction entry program, a user may connect to a web page. The web page provides an interface in which a user can enter information relevant for a transaction. The web interface may be provided directly by the transaction system, or alternatively, an interface system may be configured to offer the web interface, and to translate the information into a data format that the transaction system expects.

Nevertheless, not all transaction types are supported by a web interface. When a transaction needs to be performed that is not supported over a web interface, a user needs to be transferred from this web based environment to the transaction entry program. This is complicated in that a direct call from the web browser to the transaction entry program is either not possible and/or desirable. A conventional solution to this problem is to construct a custom command file and have the user download the command file in his/her web browser. When the command file is executed, the transaction entry program is started. The command file may be provided with information that partly configures the transaction entry program, e.g., for the desired transaction type. For example, one way to implement this on a Windows type computer, is to associate a special extension (.sap) with the transaction entry program, so that a command file with the special extension is executed by the transaction entry program.

This arrangement manages to provide a satisfactory hybrid environment, and allows continued support for transactions that are not available in the web based environment. Unfortunately, the creating, downloading and execution of the command file, is not a performant solution. An improved way to transfer to a local transaction entry program is desired.

SUMMARY

According to an embodiment, an interface system is provided. The interface system obtains computer network connection data of the client-side transaction entry program. For example, such data may be sent from the client-side computer, e.g., the client-side transaction entry program. The computer network connection data allows a connection to be made with the client-side transaction entry program. There are multiple types of data than can be used. For example, the connection data may comprise a computer network address, e.g., an IP address and/or a port address. For example, the connection data may identify a channel established with the client-side transaction entry program, e.g., over TCP. For example, the connection data may be received during a set up phase. In a later, use phase, when the transaction entry program is actually needed, the connection data may be used to directly connect to the transaction entry program, without needing to provide and execute a command file.

For example, the client-side computer may signal the need for a transaction supported by the transaction entry program by sending a begin transaction message, e.g., to the interface system. Once the begin transaction message is received, a connection is arranged between the transaction system and the client-side transaction entry program. This connection uses the connection data that was earlier obtained. No command file is needed, and a faster transfer to the transaction entry program is obtained. For example, a connection request may be sent directly to a computer address that may be comprised in the connection data to connect to the transaction entry program.

Further aspects are defined in the claims. Embodiments may include, e.g., a client-side computer, an interface system, a transaction system, and network system. An embodiment may be a method for execution on a client-side computer, and/or an interface system, and/or a transaction system, and/or network system.

An embodiment of a method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a client-side computer, FIG. 1b schematically shows an example of an embodiment of an interface system, FIG. 1c schematically shows an example of an embodiment of a transaction system, FIG. 2 schematically shows an example of an embodiment of a network system, FIG. 3a schematically shows an example of an embodiment of a network system, FIG. 3b schematically shows an example of an embodiment of a network system, FIG. 4 schematically shows an example of an embodiment of an interface method, FIG. 5 schematically shows an example of an embodiment of a network system, FIG. 6a schematically shows a computer readable medium having a writable part comprising a computer program according to an embodiment, FIG. 6b schematically shows a representation of a processor system according to an embodiment.

DESCRIPTION OF EMBODIMENTS

Figure 3A:
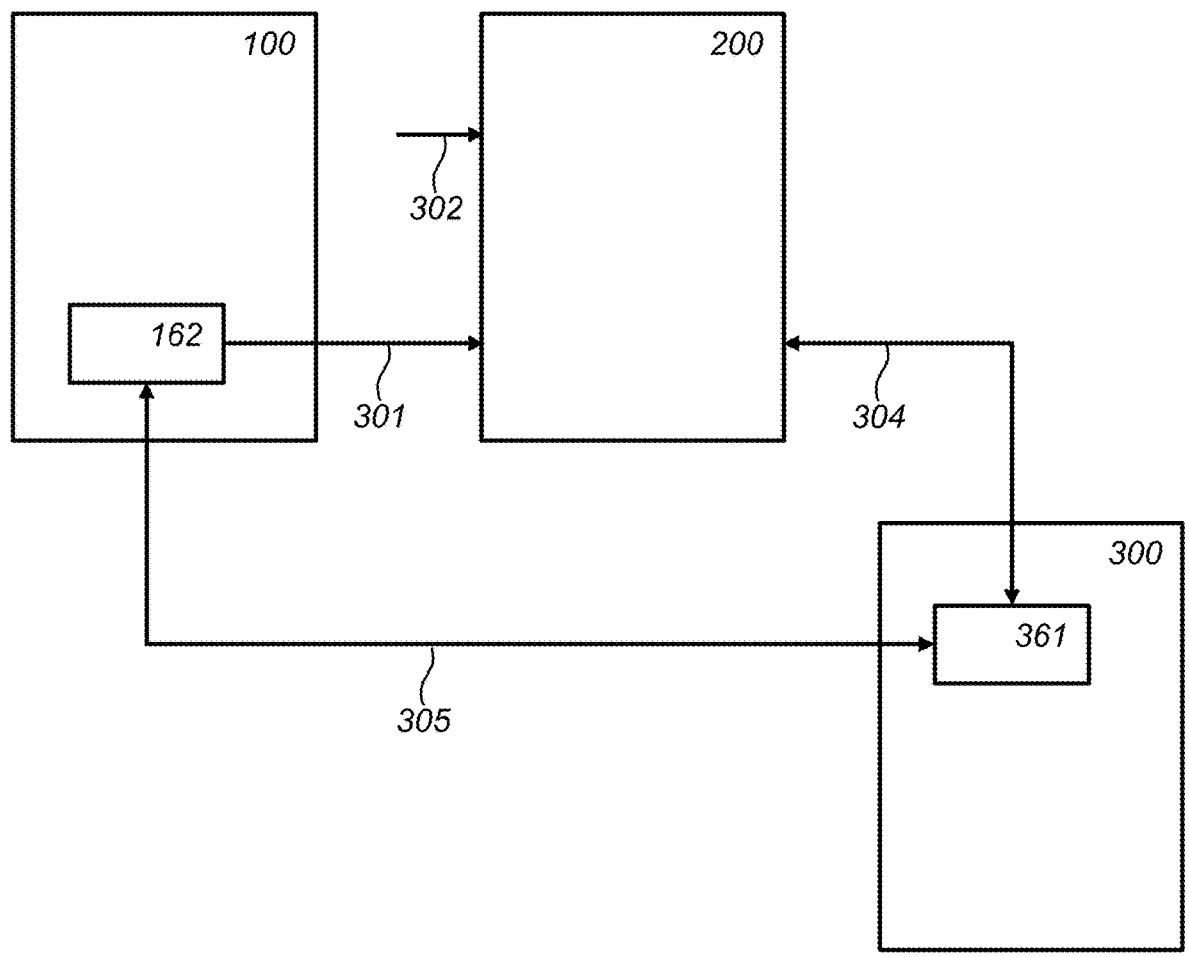

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of a client-side computer 100. FIG. 1b schematically shows an example of an embodiment of an interface system 200. FIG. 1c schematically shows an example of an embodiment of a transaction system 300.

Client-side computer 100, interface system 200 and transaction system 300 may be part of a network system 102. Network system 102 is configured to allow a user to perform data transactions on a transaction system from his/her own client computer.

For example, transaction system 300 is configured to perform a data transaction. For example, transaction system 300 may manage a database, say, a database with sales data. A data transaction may comprise the adding, amending, or deletion of a record in the database.

Transaction system 300 is configured to interface with the client-side computer, in particular with a client-side transaction entry program installed on the client-side computer. To make a transaction the client could start a transaction communication, e.g., a transaction session or protocol, between the client-side transaction entry program and the transaction system. There is a need to allow the client-side transaction entry program to be quickly started also from other environments, in particular from a client-side web browser. A transaction protocol may comprise further data configured for, e.g., message confidentiality and/or integrity.

Client-side computer 100 is configured with a client-side transaction entry program configured to communicate with a transaction system to perform the data transaction.

Interface system 200 is configured to interface between the client-side computer and the transaction system. The interfaced system can allow any program on the client-side program to quickly start the transaction entry program. In particular, the client-side transaction entry program may quickly be started from a client-side web browser.

Client-side computer 100, interface system 200 and transaction system 300 may each comprise one or more processors; and one or more storage devices storing instructions that, when executed by the one or more processors, cause the one or more processors to perform operations according to an embodiment.

Interface system 200 could be implemented as a server. Transaction system 300 could be implemented as a server. Either system could be implemented as a server cluster. Either system could be embodied as a distributed cloud-based implementation.

For example, the network system 102 may be used to allow a user to work in a first program, in particular a web browser, and quickly switch to a second program. For example, some data transaction may be performed natively in a web browser, and the transaction system may be configured for that, e.g., to communicate over http, say, over a TCP communication. However, some transaction may not be supported in that environment, and may require switching to the transaction entry program. The interface system allows a quick transition towards the transaction entry program, e.g., from a web browser.

Client-side computer 100 may comprise a processor system 130, a storage 140, and a communication interface 150. Interface system 200 may comprise a processor system 230, a storage 240, and a communication interface 250. Transaction system 300 may comprise a processor system 330, a storage 340, and a communication interface 350.

Storage 140, 240 and 340 may be, e.g., electronic storage, magnetic storage, etc. The storage may comprise local storage, e.g., a local hard drive or electronic memory. Storage 140, 240 and 340 may comprise non-local storage, e.g., cloud storage. In the latter case, storage 140, 240 and 340 may comprise a storage interface to the non-local storage. Storage may comprise multiple discrete sub-storages together making up storage 140, 240, 340. Storage may comprise a volatile writable part, say a RAM, a non-volatile writable part, e.g., Flash, a non-volatile non-writable part, e.g., ROM.

Storage 140, 240 and 340 may be non-transitory storage. For example, storage 140, 240 and 340 may store data in the presence of power such as a volatile memory device, e.g., a Random Access Memory (RAM). For example, storage 140, 240 and 340 may store data in the presence of power as well as outside the presence of power such as a non-volatile memory device, e.g., Flash memory.

Transaction system 300 may have access to a database 362. Database 362 may comprise multiple records. A record may comprise data items. For example, the database may comprise sales information, sensor readings, and the like. Database 362 may be local to transaction system 300, or may be external, but accessible by transaction system 300, e.g., using a cloud-based database. System 200 may be implemented as a device. System 300 may be implemented as a device.

The devices and/or systems 100, 200 and 300 may communicate internally, with each other, with other devices, systems, external storage, input devices, output devices, over a computer network. The computer network may be an internet, an intranet, a LAN, a WLAN, etc. The computer network may be the Internet. The devices and/or systems 100, 200 and 300 comprise a connection interface which is arranged to communicate within network system 102 or outside of network system 102 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interface 150 may be used to send or receive digital data; For example, communication interface 150 may be used to communicate with the interface system to send connection data. For example, communication interface 150 may be used to communicate with the interface system to start the server part.

The communication interface 250 may be used to send or receive digital data; For example, with the client-side computer, e.g., connection data, or a message to initiate a transaction, etc., and with the transaction system, e.g., to initiate or conclude a transaction. The communication interface 350 may be used to send or receive digital data, e.g., with the interface system to initiate a transaction, with the client-side transaction entry program to perform the data transaction.

The execution of devices and/or systems 100, 200 and 300 may be implemented in a processor system. The devices and/or systems 100, 200 and 300 may comprise functional units to implement aspects of embodiments. The functional units may be part of the processor system. For example, functional units shown herein may be wholly or partially implemented in computer instructions that are stored in a storage of the device and executable by the processor system.

The processor system may comprise one or more processor circuits, e.g., microprocessors, CPUs, GPUs, etc. Devices and/or systems 100, 200 and 300 may comprise multiple processors. A processor circuit may be implemented in a distributed fashion, e.g., as multiple sub-processor circuits. For example, devices and/or systems 100, 200 and 300 may use cloud computing.

Typically, the client-side computer 100, interface system 200 and transaction system 300 each comprise a microprocessor which executes appropriate software stored at the device; for example, that software may have been downloaded and/or stored in a corresponding memory, e.g., a volatile memory such as RAM or a non-volatile memory such as Flash.

Instead of using software to implement a function, the systems 100, 200 and/or 300 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, client-side computer 100, interface system 200 and transaction system 300 may comprise circuits, e.g., for cryptographic processing, and/or arithmetic processing.

In hybrid embodiments, functional units are implemented partially in hardware, e.g., as coprocessors, and partially in software stored and executed on the device.

FIG. 2 schematically shows an example of an embodiment of a network system 102. Network system 102 may comprise multiple client-side computers; shown are client-side computer 100.1 and 100.2. Network system 102 may comprise multiple interface systems; shown is one interface system 200. Network system 102 may comprise multiple transaction systems; shown is one transaction system 300. The devices are connected through a computer network 172, e.g., the Internet. The client and interface system may be according to an embodiment.

FIG. 3*a* schematically shows an example of an embodiment of a network system. The network system of FIG. 3*a* comprises a client-side computer 100, an interface system 200, and a transaction system 300; for example, these systems could be implemented as described with reference to FIGS. 1*a*-1*c*.

Transaction system 300 is configured to perform a data transaction. For example, transaction system 300 may implement a server process for transactions 361. Transaction system 300, e.g., server process for transactions 361 is configured to perform data transactions, e.g., in a database. The database is not shown separately in FIG. 3*a*. The database may be local or external to system 300.

Some supported transactions may be performed through a web interface which may be offered by system 300 or 200. But some transactions may not be supported. For those types of transaction, the transaction system is configured to interface with a client-side transaction entry program. For example, client-side transaction entry program and transaction system 300 may be configured to perform a protocol, or session over a computer network. The client-side transaction entry program opens a user-interface on the client-side computer that allows the user to enter the data pertinent to the transaction. For example, the user may enter new data to be added in a record, and so on.

A user who is working on transactions without using the transaction entry program may sometimes be forced to switch to using the transaction entry program, e.g., to perform transactions that are not supported in the other environment, e.g., in the web browser. There is a need to perform such a switch quickly.

Interface system 200 is configured to interface between the client-side computer and the transaction system.

Set Up Phase

In a first set up phase, the computer network connection data 301 is exchanged to allow a connection to quickly be established with the client-side transaction entry program. For example, client-side computer 100 may be configured to send computer network connection data 301 of the client-side transaction entry program to interface system 200. The computer network connection data can be used later to make a connection with the client-side transaction entry program. There are several ways to implement computer network connection data 301. For example, computer network connection data 301 may comprise information such as an IP address, and port address.

For example, computer network connection data 301 may comprise an identifier, identifying a communication channel established between client-side computer 100 and interface system 200. For example, in an embodiment, the client-side computer is configured to establish the channel with the interface system, which the client-side computer and interface system keep open until needed later for a transaction. The channel may be implemented as a queue.

Interface system 200 is configured to obtain computer network connection data 301 of the client-side transaction entry program, e.g., by receiving it from the client-side computer.

In an embodiment, the client-side transaction entry program is configured to connect to interface system 200, and send connection information. Interface system may be configured to start a process to interface with the client-side transaction entry program. Instead or in addition of the client-side computer sending the connection information, the interface system may derive it, and send it to the client-side computer. For example, a cryptographic key may be exchanged, a session identifier may be sent, and so on.

In an embodiment, the client-side computer, e.g., the transaction entry program may be configured to send a launching message to the interface system. The launching message could comprise computer network connection data of the client-side transaction entry program; the computer network connection data could be sent, received, or otherwise established later as well.

Use Phase

In a second phase, e.g., a use phase, once the connection data has been sent, the interface system is capable of establishing a connection with client-side transaction entry program, e.g., by using an existing session, or by connecting using the connection data 301. From that point, the user can request the interface system to switch control from another environment, e.g., a web-browser to the client-side transaction entry program.

For example, the interface system and/or the transaction system may send a message over the computer network to a computer network address, e.g., an IP address, possibly together with a port address, which may be comprised in the connection data. The transaction entry program may be configured to receive said message and to cooperate in creating the transaction, e.g., by participating in a transaction protocol.

For example, the client-side computer may be configured to send a begin transaction message 302 to the interface system indicating a request to launch a transaction. The computer network connection data is sent before the begin transaction message. For example, it is envisioned, that the transaction entry program is invoked at the beginning of a work session of a user, so that later in the work session, the user can quickly switch to the transaction entry program. Alternatively, the connection data may be sent when a switch is needed for the first time. Although at that particular point, the switch may not be established as quickly as would otherwise be possible, but a next time a switch is needed this can be accomplished quickly using an embodiment.

When the interface system receives the begin transaction message 302 from the client-side computer indicating a request to launch a transaction, the interface system sets up a connection 305 between transaction system 300 and the client-side transaction entry program. The session will use the computer network connection data that enabled the client-side transaction entry program and the transaction system to cooperate in performing the transaction.

For example, the interface system may set up connection 305 between the transaction system and the client-side transaction entry program by sending a message 304 towards the transaction system, e.g., comprising the connection data. The transaction system may then use the connection data to connect to the client-side transaction entry program. The transaction communication, e.g., a protocol, may run over TCP or another computer network protocol.

For example, the setting up of the connection may comprise sending an initiation message 304 to the transaction system. The interface system then uses the connection data itself to relay data between the transaction system and the client-side transaction entry program.

The client-side transaction entry program may open a new window on the client-side computer when a session with the transaction system is established. For example, the user may work in a first program, e.g., a data editor, e.g., a web browser. The user may click on a button, or the like, to start a transaction that is not supported in the web browser. As a result of the behind the scenes work of the interface system, a window will open from the transaction entry program to allow the user to continue with the transaction. Thus, once the server part is started, e.g., once a day, it may launch a transaction, e.g., VA01 "create sales order", when the user indicates he/she needs it, e.g., indicated by a click on the corresponding button in the browser or selected from a navbar entry.

The transaction system receives from the client-side transaction entry program instructions for the data transaction, and performs the data transaction.

Once the client-side transaction entry program and the transaction system have concluded their work, e.g., the user entered the information defining the transaction and the transaction system performed the transaction, the transaction system may send a result code to the interface system. For example, the result may indicate that the session is completed. The interface system may be prompted to send a message to the first program, e.g., the web browser to allow the user to continue to work in the web browser environment. The result code may comprise a key that allows future reference to the transaction that was performed, e.g., an identifier. The result code may be forward to the client-side computer by the interface system.

Figure 3B:
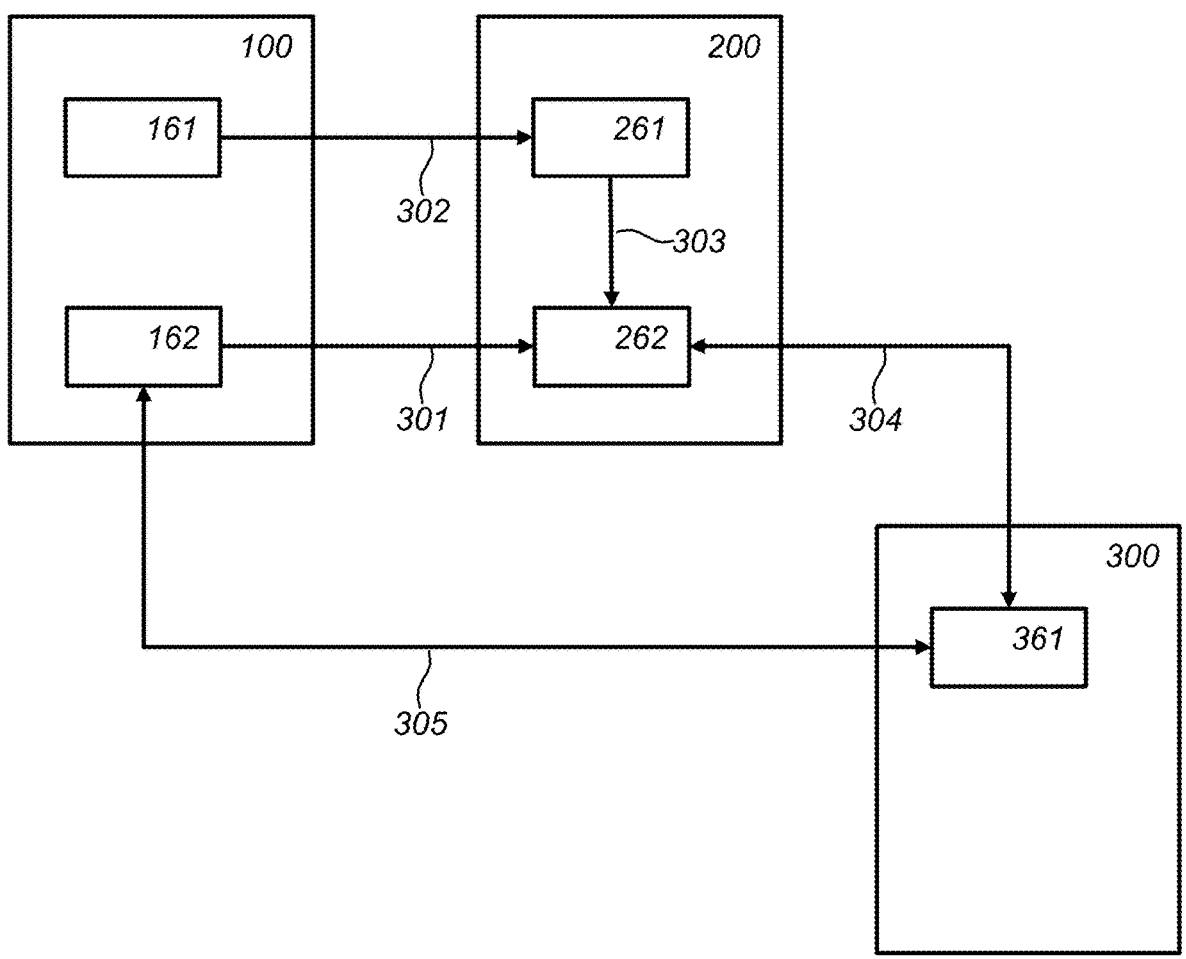

FIG. 3b schematically shows an example of an embodiment of a network system. The network system of FIG. 3b adds further elements to the embodiment shown in FIG. 3a. In the network system of FIG. 3b, the interface system is organized in a client part and a server part. Furthermore, in the network system of FIG. 3b, the client-side computer is provided with a client-side web browser 161. The web browser may be used to send begin transaction message 302. Note that a web browser may be used without an organization in client and server part, or vice versa, but their combination is particularly useful.

For example, in an embodiment, interface system 200 comprise a client part 261 and a server part 262. The client part is configured for receiving the begin transaction message 302. The server part is configured for obtaining the computer network connection data 301 and sending the initiation message 304.

For example, the client part 261 may be configured to process http requests received from the client-side computer. The begin transaction message from the client-side computer may be received as an http request. For example, the client part 261 may comprise a web server.

Client part 261 and server part 262 may be connected through an asynchronous channel. For example, client part 261 may send a further begin transaction message 303 through the channel to server part 262, upon receiving the begin transaction message 302. Server part 262 may then use connection data to establish a connection 305.

Server part 262 may be started upon receiving a launching message at the interface system. For example, the launching message may comprise the computer network connection data of the client-side transaction entry program.

For example, transaction system 200 may be configured with a launching application, which could be part of the client part. The launching application will start the server program upon receiving the launching message.

In an embodiment, connection data obtained from connection data 301 may be stored in interface system 200 associated with an identifier. The identifier is associated with a user of the client-side computer. For example, a user may identify him/herself with an identifier, and/or may be assigned an identifier by the interaction system. The connection data may be stored together with the identifier. The begin transaction message may also be associated with the identifier. For example, a user may login with the same credentials in a web-based environment as well as in the transaction entry program. For example, when a user initiates a transaction that causes a begin transaction message to be sent, the interface system may retrieve the connection data that is associated with the same user, e.g., by retrieving an identifier for the user, and then retrieving connection data stored in association with the identifier. Once the connection data has been obtained, e.g., by the interface system, possibly by the client part of the interface system, a session can be established, e.g., by sending a message using the connection data, and/or forwarding the connection data to the transaction system.

In an embodiment, the network system comprises a transaction system. The transaction system may comprise a database system, e.g., comprising one or more databases. The transaction system may be implemented on one or more servers. The network system may also comprise one more interface systems. The interface system may comprise an application server, e.g., implemented on some hardware, e.g., a further server. An application server may use the database system for persistence. The application server may be available in a network environment.

For example, the application server may include: an http server, a system configured to support the transaction entry program, a system configured to allow calls to defined function modules, e.g., via a remote function call, e.g., using the SAP RFC protocol. The http server and other systems may be installed on one or more servers.

A client-side browser may open a URL referencing the interface system, e.g., an application server. Note that load balancing may be used in the network system. The transaction entry program may be started with the connection information to one of the SAP application servers; again load balancing may be used.

Figure 4:
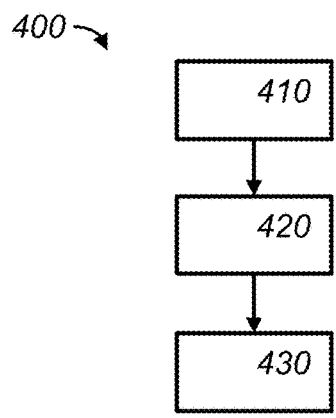

FIG. 4 schematically shows an example of an embodiment of an interface method 400. Interface method (400) is configured to interface between a client-side computer and a transaction system, the client-side computer being configured with a client-side transaction entry program configured to communicate with the transaction system to perform a data transaction, the method comprising:

obtaining (410) computer network connection data of the client-side transaction entry program, said computer network connection data allowing a connection to be made with the client-side transaction entry program, receiving (420) a begin transaction message from the client-side computer indicating a request to launch a transaction, the computer network connection data being obtained before receiving the begin transaction message setting (430) up a connection between the transaction system and the client-side transaction entry program using the computer network connection data enabling the client-side transaction entry program and the transaction system to cooperate in performing the transaction.

Below several further optional refinements, details, and embodiments are illustrated.

As first example, may start in a browser window on the client machine, e.g., a button may be clicked.

This starts a http request on the interaction center SAP system (not connected to an SAPGUI as started via browser) à process A on interaction center system.

Process A sends a message to an already running server process B on interaction center system, waiting on a defined channel (think of something like named queues). Server process B was already started, e.g., via SAPGUI and thus has a connection to the SAPGUI window running on the same machine as the browser.

Various form of data may be used to send from process A to process B. This data can be:
System to be used to call transaction
what to call in that system (=BOR object type and method)
Any parameter the method call would need
e.g., for method to create a sales order, a customer number would be needed and a sales order type At that point, the process B, which also runs on the interaction center system calls the defined RFC function module (FM) using the configured destination for given target system
Again, parameters are transferred:
what to call in that system (=BOR object type and method)
Any parameter the method call would need
e.g., for method to create a sales order, a customer number would be needed and a sales order type The RFC call technically goes directly from the interaction center server to the target (=transaction) system
The information how to connect to the SAPGUI window may be transferred from the interaction center system to the target system. The interaction center system may serve as a relay system that forwards all SAPGUI messages from the existing SAPGUI window of the client machine to the target system back and forth. In any case, the server process on target system is enabled to contact SAPGUI program on local machine and vice versa.

Figure 5:
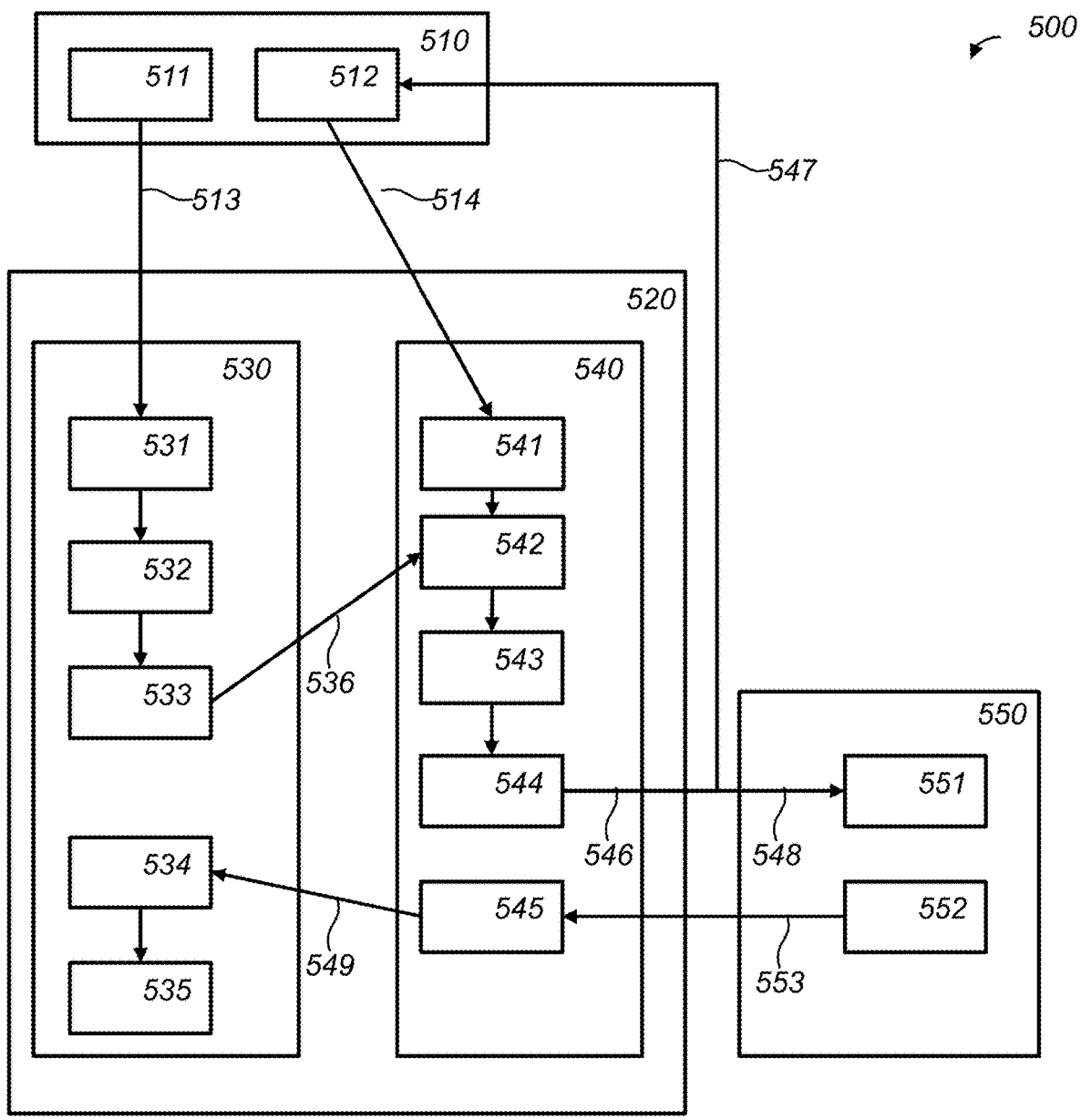

FIG. 5 schematically shows an example of an embodiment of a network system 500. FIG. 5 is a block diagram that shows units and/or actions taken by various parts of the network system.

The network system comprises a client-side computer 510, an interface system 520, and a transaction system 550. The transaction system is also referred to as the target system. Typically, multiple client-side computers are part of the network system. There may be only one interface system and one transaction system, though there could be more of either. Although only a single interface system might be used, it may instantiate separate client parts and/or server parts for each client-side computer. The server part may be implemented as a server program, e.g., running in a server process. The server process may be specific for a client-side computer. For example, if multiple clients use the interaction system, then multiple server parts may be instantiated.

Client-side computer 510 is configured with a client-side transaction entry program 512.

Many types of data transaction may be performed from a web-browser, e.g., directly supported by the transaction system. Some transactions require the use of the transaction entry program 512. An interface system 520 facilitates transferring toward the transaction entry program on the client-side computer. Interface system 520 can be accessed by a user using a web browser running on the client-side computer. FIG. 5 shows web browser 511.

In an embodiment, transaction system 550 is an SAP server, for example an SAP NetWeaver Application Server, and client-side transaction entry program could be the SAPGUI application. An example of a transaction that is currently only supported by SAPGUI is the sales order creation (transaction VA01). SAPGUI is a local program on a client desktop to connect to an SAP server. SAPGUI is a standalone application. As an example, the interface system may be implemented in the SAP Interaction Center. The SAP Interaction Center is an application running on a server.

An embodiment supports starting a new transaction in a performant way. Experiments lowered the launching time to about 1 second, which previously was about 4-5 seconds. For example, conventionally, the SAP Interaction Center may generate a launch file and send it to the client-side computer. The launch file contains the relevant information for starting SAPGUI. The user then causes the launch file to be executed, e.g., by clicking on it. The launch file is configured to start the transaction entry program, and possibly to pass information to the transaction entry program, e.g., for the desired transaction. In an embodiment, a launch file is avoided as a direct connection can be made to the transaction entry program using connection data, e.g., from the interface system and/or from the transaction system.

In an embodiment, a server part 540, e.g., implemented as a server process, is started on the interface system 520 directly via client-side transaction entry program 512, e.g., once a day. This server part 540 waits for a message from a client part 530, possibly implemented as a server process as well. For example, client part 530 may be browser-based, or accessed from any other client-side program.

There are various options to cause the server part to start up. For example, a user may connect to the interface system using his transaction entry program, e.g., SAPGUI, which may start the server part. The transaction entry program could be started directly by the user, e.g., manually, or could be started by receiving a command file instructing comprising an instruction to start the transaction entry program and/or connect to the interface system; for example, a so-called .sap file may be used for this purpose. The server part could also be started by the client part. For example, the client part may be configured to detect if the server part is running or not, and if not to start it. For example, when the user starts the begin transaction message, the client may check if a server part is listening on the channel.

For example, in an SAP environment, the SAP Interaction Center may start a transaction, which can be started via a Business object repository (BOR) method even in another SAP system. For example, the transaction that is to be performed, say, 'create sales order', may be predefined in the BOR method. As the process flow remains inside the SAP system(s), it can be more performant.

For example, in an embodiment, a user manually starts the transaction entry program, and then calls the client part via a web browser. In the web environment, e.g., in a web page served by the interaction system, a button is provided to start a transaction, e.g., an order creation. When the button is pressed, a message is sent to the transaction entry program, the BOR method may be called, etc. For example, the following steps may be used:

1. Start the client-side transaction entry program
2. Client-side transaction entry program connects to the interface system. This starts server part 540 on the interface system. In an embodiment, the server process maintains a connection to the client-side transaction entry program.
3. User starts the client-side browser, and connect to the client part of the interface system,
4. User clicks on a button, e.g., to create a sales order, e.g., in a web browser
6. Interface system starts processing on the transaction system. For example, the client part calculates parameter data 532 and sends a message 536 to server part 540 on the interface system. Server part 540 then sends message 546 to start processing on the transaction system.
7. The transaction system sends a message to client-side transaction entry program
8. Client-side transaction entry program starts the transaction, e.g., calls the BOR method. For example, server part 540 on interface system 520 may open a new window of the client-side transaction entry program to support the new transaction and start the transaction on the transaction system using the newly opened window of the client-side transaction entry program Below possible embodiments of the various parts are described with further exemplifying details.

Client Part 530

As an example this could be a modified SAP Interaction Center; In particular, the specific mechanism to trigger the server part and/or to cooperate with the server part can vary. The client part may maintain a way to launch a transaction, e.g., a Transaction Launch Entry to call BOR method.

FIG. 5 shows receiving begin transaction message 531. The begin transaction message 513 is received from the client-side computer. For example, the user selects a navigation bar entry that starts processing, e.g., a Transaction Launch Entry, e.g., from a web page served by the client part. The begin transaction message 531, e.g., through a button press, may be received from client-side web browser 511. Any other mechanism for triggering the function in the client can be used. Next FIG. 5 shows building message 536. A message 536 for the server part may be built here. The message may contain one or more information items such as: the type of transaction, the transaction system needed, other parameters for starting the transaction, session identifiers.

For example, if the BOR method is used, the following may be done:
Build message data to be sent to server part to call BOR method.
  From Transaction Launch Entry:
    BOR type
    BOR method
    Mapped target system
    Handler class for transaction launch (needed to calculate BOR method parameters)
  Determine own (source) session parameters
    Own logical system
    Session type ('SAM')
    Session ID Finally, the client part 530 may be configured for calling 533 server part 540. For example, message 536 may be sent with message data to a channel of server part For example, in an SAP environment, the client part may be implemented as follows, and run from Interaction Center. The user selects an entry from the navigation bar in his/her browser. The entry may be defined as a logical link. The logical link may refer to:

parameter class, which implements interface IF_WCF_UI_NAVIGATION_CONTROL, and

A parameter value, which refers to a transaction launch ID (entry in table CRMC_IC_LTX_ID)

Choosing an entry in navigation bar calls method IF_WCF_UI_NAVIGATION_CONTROL~ EVALUATE_PARAMETERS of parameter class providing parameter value as method parameter.

Process flow:
Parameter class method IF_WCF_UI_NAVIGATION_CONTROL~ EVALUATE_PARAMETERS
  Get transaction launch definition (entry in table CRMC_I-C_LTX_ID)
    Use CL_WCF_LTX_CB, method GET_LTX
  The transaction definition may contain the following information:
    BOR type
    BOR method
    Mapped target system
    Handler class for transaction launch
  Build Process Class ID from BOR type and method.
  Determine logical system from mapped target system
  Build BOR method parameters with the help of handler class for transaction launch
    Call SWC_ELEMENT_SET, SWC_TABLE_SET as required to build table of SWCONT.
  Determine own (source) session parameters
    Own logical system
    Session type ('SAM')
    Session ID
      Class CL_ICWC_SESSION_REGISTRY method GET_AGENT_SESSION_ID
  Export message variables to data buffer
  Create AMC message producer for own AMC application and (binary) channel
    AMC Application: e.g., ZLTX_SAPGUI
    AMC channel: e.g.,/start_BOR
      Type: binary
      Scope: user
  Send message with export message data to AMD server program Server Part 540

The server part is typically started 541 before performing a transaction. For example, interface system 520 receives a connection message 514; interface system 520 is configured to start the server part upon receiving connection message 514. Typically, connection message 514 is received before, begin transaction message 513. For example, connection message 514 may be part of a first phase, e.g., a set up phase, while begin transaction message 513 may be part of a second phase, e.g., a use phase.

The server part may be started well before, e.g., once a day, possibly even before the client part. For example, the server part may be started from the client-side computer, e.g., as a command started automatically, e.g., when a user log's in, boots-up, starts the transaction entry program, or the like. Alternatively, the server part may be started with the first transaction, but then kept alive to speed up later further transactions.

A channel is established between the server part and the client part for receiving messages from a client part. The channel may be an asynchronous channel. In an SAP system this may be implemented by an ABAP Message Channel, e.g., AMC, application component BC-MID-AC.

Server part 540 may perform the following process flow:
  Open 542 message channel to receive messages from the client part
  Wait for message on the channel 543
    Messages will be sent from client part (see below).
  On message arrival 543, e.g., receiving the further begin transaction message 536, a transaction is started with the transaction system 550. For example, this may be implemented as follows:
    Message 536 contains data to call the intended BOR transaction.
    Start transaction to call BOR method (in new client-side transaction entry program Mode)
    Hand over message data as report parameter
  For example, in an SAP system, the server part may be implemented by
    Create AMC Message Consumer for own AMC application and (binary) channel
      AMC Application: e.g., ZLTX_SAPGUI
      AMC channel: e.g.,/start_BOR
        Type: binary
        Scope: user
    Start message delivery for channel
    Wait for messaging channels until message has arrived
      Messages will be sent from Interaction Center (IC) application (see below)
      Message content is an export (to data) with variables arranged to call BOR transaction
    Convert binary message data to character format (e.g., encode base64)
      Information arranged to call BOR transaction is now in text format.
    Create new SAPGUI Mode with FM TH_CREATE_MODE
    Start transaction similar to LTX_SAPGUI (program CRM_LTX_SAPGUI_INVOKE)
      E.g., transaction ZLTX_SAPGUI, program ZLTX_SAPGUI_INVOKE
    Hand over message data (in text format) as report parameter
  Once a request for a new transaction has reached the server part. Starting transaction 544 may be executed. This creates a session between the client-side transaction entry program 512 and transaction system 550. For example, starting transaction 544 may send an initiation message 546 to establish the session. The initiation message 546 may comprise a client-side initiation message 547 for the transaction entry program 512, and a part for transaction system 550. For example, initiation message 546 may comprise a transaction server-side initiation message 548 for transaction system 550. In an embodiment, only one of messages 547 and 548 is used.

Communication between the transaction entry program and the transaction system may use a communication interface, which may be implemented in both the transaction entry program and the transaction system, For example, the interface system may call a function to be executed in the transaction entry program and/or the transaction system.

Calls between the system, in particular the message 546, 548 and/or 547 may be transferred, e.g., by CPI-C or TCP/IP.

For example, if the BOR method is used, this may comprise a Transaction to Call BOR Method, started from server part 540 when message 536 is received. Transaction to Call BOR Method may user the following process flow:
Extract message data to call BOR transaction
  Target system
  Process Class ID, containing BOR class and method
  BOR method parameters (e.g., table of SWCONT)
  Client application session parameters
Call BOR method
  For example, call the client-side transaction entry program, e.g., call FM WCF_LTX_EWB_PROC_CREATE_SAPGUID
  Via a remote function call (RFC) destination for target system
  With parameters (Process Class ID, table of SWCONT)
    Example: calling BOR method BUS2032.CreateWithDia returns Starts transaction VA01 (in target system).

For example, in an SAP environment the "Transaction to Start BOR method" may be started from the server part when the message is received. It may report with functionally similar to standard program CRM_LTX_SAPGUI_INVOKE, e.g., ZLTX_START_SAPGUI. Report has one parameter for message data from Interaction Center (IC) in text format.
Process flow:
  Decode text message data to binary format (e.g., decode base64, see server program)
  Import message data to variables arranged to call BOR transaction
    Note: binary data is an "export to data"
    Relevant variables:
      Logical system of target
      Process Class ID (containing BOR class and method)
      BOR Method parameters (table of SWCONT)
      Interaction Center session parameters
  Determine RFC destination to target system
  Make BOR method call
    Call FM WCF_LTX_EWB_PROC_CREATE_SAPGUI
    Via RFC destination
    With parameters (Process Class ID, table of SWCONT)
    Receive return object key, which is instance key of BOR object
      Example: calling BOR method BUS2032.CreateWithDia returns new sales order ID At this point the transaction is managed by cooperation between the client-side transaction entry program and the transaction system. At this point, server part 540 or interface system 520 need no not be involved. On the other hand, the session could be established by using the interface system or its server part as a relay. When the transaction concludes, the transaction system 550 may send a result code, e.g., a first result message 553. The result may comprise an identifier of an object created through the transaction, e.g., a record. The server part receives the result in 545. The result code may be forwarded to the client part. For example, the receiving part 545 may send a second result message 549 to the client part, e.g., to an interface callback API 534. The client part may use the result code for further processing 535; e.g., forward the result to client-side computer, store the result, report the result, and so on. The result code may comprise an instance key: the number of the sales order. Save that in the interaction center.

The server part may perform the following process flow:
Receive result, which typically is the instance key of the BOR object created.
  Example: calling BOR method BUS2032.CreateWithDia returns new sales order ID.
If result instance key is returned:
  Send back to client application session
    Example: Interaction Center (IC) will store instance key in IC Activity Clipboard.
Close own client-side transaction entry program mode.

Closing the client-side transaction entry program mode, typically has the result of closing a window in which the client-side user entered information for the transaction system.

For example, in an SAP environment, closing the transaction in the server part may be implemented as follows:
If return object key is given
  Send back to Interaction Center (IC) session for IC Activity Clipboard
  Class CL_SSC_IC_CALLBACK
    Call method SET_SOURCE_SESSION with session parameters
    Call method ADD_TO_IRECORD with BOR object and returned object instance key
  Close own SAPGUI mode with FM TH_DELETE_MODE Transaction system 550 may comprise transaction communicating 551 configured to receive the message 548. Transaction system 550, e.g., part 551, may be configured to set up a session with transaction entry program 512, and to cooperate with it to obtain all needed information to define a transaction. Transaction system 550 may comprise transaction processing 552 for performing the transaction. As a result, a database of transaction system 550 may be modified. A result message 553 may be returned to the interface system 540.

Accordingly, in an embodiment. An interface system runs a client part and a server part. The client-side computer runs a web browser, and a transaction entry program, e.g., SAPGUI. A transaction server, e.g., a server Target system, runs a database, e.g., an SAP system, etc. The client part may be trigged by the client-side web browser. For example, the client part may be triggered by a web server in the interface system, or the client part may comprise a web server, etc. For example, when a user presses a button in a browser, this will send an http request to the interface server. The client part then builds a message which contains the information needed to start a transaction, e.g., the BOR method. The server part may be previously connected to the transaction entry program, e.g., for example, a TCP pipe or the like may be established, e.g., with SAPGUI. The server part starts the transaction, e.g., calls the BOR method, this may open a new window of the transaction entry program, e.g., of SAPGUI. Setting up the session between the client-side transaction entry program and the transaction system may use a remote function call (RFC), e.g., calling a function in a remote system over a computer network, e.g., over TCP. For example, the remote function call may instruct a module in another system. The instruction may comprise a destination; the destination may be a definition how to connect to that other system. The destination may comprise a server name, port name, or the like. The destination information allows the transaction system to connect to the transaction entry program on the client-side computer. In an SAP system the module that is called may be named: WCF_LTX_EWB-_PROC_CREATE_SAPGUI, though this can be varied. The called module instantiates the BOR object and calls the method; for example, the transaction may be initiated and a session with the transaction entry program may be established.

In an embodiment, the server part is started by the client-side computer, by sending a connection message 514. For example, a user may manually connect to the interaction system via client-side transaction entry program and start the server part. In order to avoid this, it is possible to start the server part when needed, e.g., when client-side computer, e.g., browser 511 sends a message and no server part is listening. The process flow may be adapted in following way:
Client Part
After client part has sent message to channel of server part:
Open message channel to receive acknowledge and waits for acknowledge message from server part for a short period of time (e.g., 1 sec)
If no acknowledge message arrives from server part, start client-side transaction entry program transaction in an alternative way. For example,
The user may receive a command file, e.g., a .sap file, at the client-side computer. When the command file is executed, the program is started, e.g., SAPL-OGON or SAPGUI.
Transaction will then start server process with an option to trigger an acknowledge message as soon as server process is ready to receive message.
After launching the server part, client part will wait for acknowledge message from server part.
When that acknowledge message arrives, client part sends original message once again to finally start the client-side transaction entry program transaction. Server part
Provides a way to be started to send an acknowledge message right before it starts waiting for messages from client part.
For this, an additional channel might be used.
In addition, an acknowledge message is sent each time, a message from client part is received via additional channel.

Accordingly, in further example, user may initiate a transaction in a browser window on the client machine, e.g., a button may be clicked. This starts a http request on the interaction center SAP system. We will refer to this part of the interaction center SAP system as process A. The interaction center system is an example of an interface system. Process A sends a message to an already running server process B on the interaction center system, waiting on a defined channel. Server process B was already started, e.g., via SAPGUI and thus has a connection to the SAPGUI window running on the same machine as the browser. SAPGUI is an example of a transaction entry program.

Various form of data may be used to send from process A to process B. This data can be:
System to be used to call transaction
what to call in that system (=BOR object type and method)
Any parameter the method call would need
e.g., for method to create a sales order, a customer number would be needed and a sales order type
At that point, the process B, which also runs on the interaction center system calls the defined RFC function module (FM) using the configured destination for given target system. The RFC function module is an example of a mechanism to set up a connection between the transaction system and the client-side transaction entry program. Again, parameters are transferred, for example:
what to call in that system (=BOR object type and method)
Any parameter the method call would need
e.g., for method to create a sales order, a customer number would be needed and a sales order type
The RFC call may go directly from the interaction center server to the target system. The target system is an example of a transaction system. The information how to connect to the SAPGUI window may be transferred from the interaction center system to the target system. The interaction center system may serve as a relay system that forwards all SAPGUI messages from the existing SAPGUI window of the client machine to the target system back and forth. In any case, the server process on target system is enabled to contact SAPGUI program on local machine and vice versa.

Many different ways of executing a method according to an embodiment are possible, as will be apparent to a person skilled in the art. For example, methods according to an embodiment may run on the client-side, e.g., the browser and/or transaction entry program, the interface system, e.g., the client part and/or server part, and possibly further parts, the transaction system. The method may be method 400, show in FIG. 4.

For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 400, etc. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 6A:
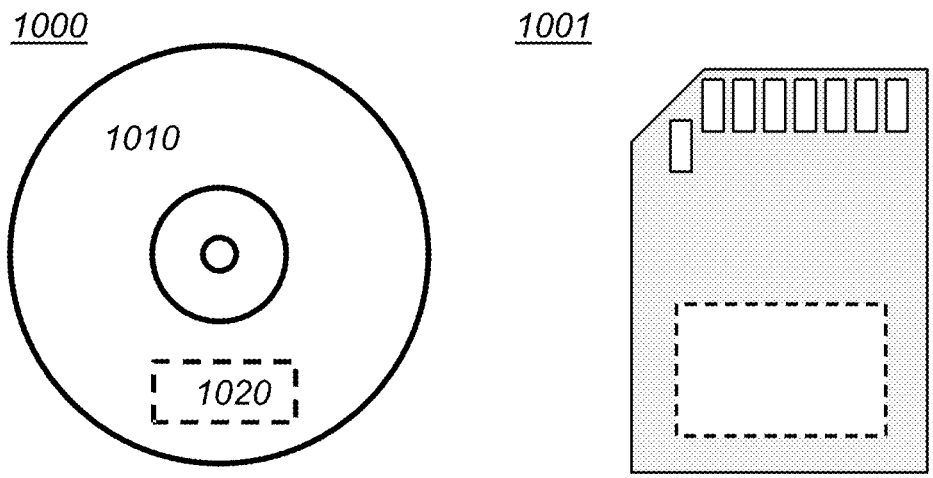

FIG. 6a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform a method according to an embodiment, e.g., an interface method. The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The data 1020 comprises instructions for causing a processor system to perform the method according to an embodiment, e.g., an interface method.

Figure 6B:
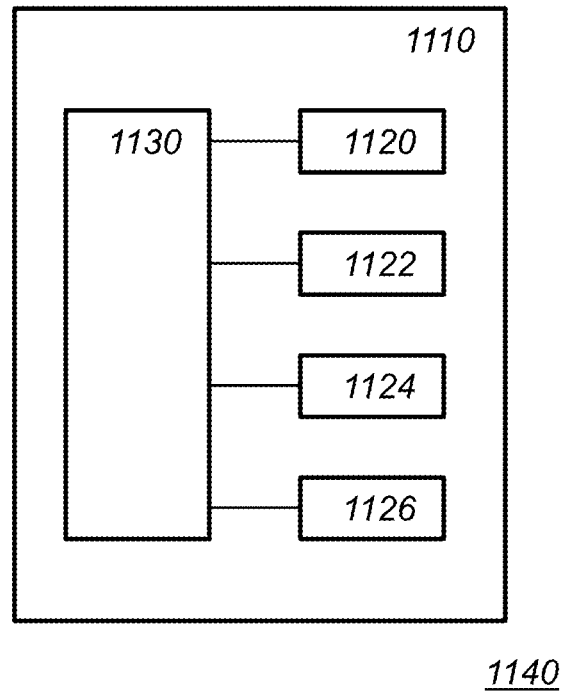

FIG. 6b shows in a schematic representation of a processor system 1140 according to an embodiment, e.g., of the interface system, transaction system, and/or client-side computer. The processor system 1140 comprises one or more integrated circuits 1110. The architecture of the one or more integrated circuits 1110 is schematically shown in FIG. 6b. Circuit 1110 comprises a processor 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors, or both, and the like. Circuit 1110 may comprise a dedicated integrated circuit 1124 for performing part or all of the processing defined in the method. Processor 1120, memory 1122, dedicated integrated circuit 1124 and communication element 1126 may be connected to each other via an interconnect 1130, say a bus. The processor system 1140 may be arranged for contact and/or contact-less communication, using an antenna and/or connectors, respectively.

For example, in an embodiment, processor system 1140, e.g., the interface system, etc., may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While the processor system 1140 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the processor system 1140 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

What is claimed is:

1. An interface system comprising:
one or more processors; and
one or more storage devices storing instructions that, when executed by the one or more processors, cause the one or more processors to perform operations for:
obtaining computer network connection data of a client-side transaction entry program installed on a client-side computer separate from the interface system, said computer network connection data allowing a connection to be made with the client-side transaction entry program;
receiving a begin transaction message from the client-side computer indicating a request to launch a transaction and to switch control for performing the transaction from a client-side web browser to the client-side transaction entry program, the computer network connection data being obtained before receiving the begin transaction message;
setting up a connection between a transaction system and the client-side transaction entry program installed on the client-side computer using the computer network connection data enabling the client-side transaction entry program and the transaction system to cooperate in performing the transaction, wherein the transaction system is separate from the interface system and from the client-side computer, wherein the interface system is configured to interface between the client-side computer and the transaction system, the client-side transaction entry program being configured to communicate with the transaction system to perform a data transaction; and
in response to receiving information from the transaction system indicating that the transaction has been completed, sending a message to the client-side web browser to enable a subsequent transaction to be performed by the client-side web browser.

2. An interface system as in claim 1, wherein the operations comprising processing of http requests received from the client-side computer, the begin transaction message from the client-side computer being received as an http request.

3. An interface system as in claim 2, wherein the setting up of the connection comprises sending an initiation message to the transaction system comprising the computer network connection data.

4. An interface system as in claim 3, wherein the setting up of the connection comprises sending an initiation message to the transaction system, and relaying data between the transaction system and the client-side transaction entry program.

5. An interface system as in claim 4, wherein the instructions comprise a client part and a server part, and wherein the client part is configured for receiving the begin transaction message and the server part is configured for obtaining the computer network connection data and sending the initiation message.

6. An interface system as in claim 5, wherein the client part comprises a web server, the client-side computer being configured with a client-side web browser configured to communicate with the web server of the client part.

7. An interface system as in claim 6, wherein the client part and the server part are connected through an asynchronous channel.

8. An interface system as in claim 7, wherein the operations comprise:
receiving a launching message for launching the server part, upon receiving the launching message the server part is initiated.

9. An interface system as in claim 8, wherein the launching message comprises the computer network connection data of the client-side transaction entry program.

10. An interface system as in claim 1, wherein the operations comprise receiving from the transaction system a transaction result and forwarding the transaction result to the client-side computer.

11. An interface system as in claim 1, wherein setting up the connection between the transaction system and the client-side transaction entry program causes the client-side transaction entry program to open a new window on the client-side computer.

12. A method configured to interface between a client-side computer and a transaction system, the client-side computer being configured with a client-side transaction entry program configured to communicate with the transaction system to perform a data transaction, the method comprising:
obtaining computer network connection data of the client-side transaction entry program installed on the client-side computer separate from an interface system, said computer network connection data allowing a connection to be made with the client-side transaction entry program;
receiving a begin transaction message from the client-side computer indicating a request to launch a transaction and to switch control for performing the transaction from a client-side web browser to the client-side transaction entry program, the computer network connection data being obtained before receiving the begin transaction message;
setting up a connection between the transaction system and the client-side transaction entry program installed on the client-side computer using the computer network connection data enabling the client-side transaction entry program and the transaction system to cooperate in performing the transaction, wherein the transaction system is separate from the interface system and from the client-side computer; and
sending a message to the client-side web browser to enable a subsequent transaction to be performed by the client-side web browser in response to receiving information from the transaction system indicating that the transaction has been completed.

13. A method as in claim 12, wherein the method comprises a client part and a server part, and wherein the client part comprises receiving the begin transaction message and the server part comprises obtaining the computer network connection data and sending the begin transaction message.

14. A method as in claim 13, wherein the client part is executed by a web server, the client-side computer being configured with a client-side web browser configured to communicate with the web server.

15. A method as in claim 14, wherein the client part and the server part communicate through an asynchronous channel.

16. A method as in claim 15, the method further comprising:
receiving a launching message for launching the server part, and launching the server part upon receiving the launching message.

17. A non-transitory computer readable medium comprising data representing instructions for interfacing between a client-side computer and a transaction system, which when executed by a processor, cause the processor to:
obtain computer network connection data of a client-side transaction entry program installed on the client-side computer separate from an interface system, said computer network connection data allowing a connection to be made with the client-side transaction entry program;
receive a begin transaction message from the client-side computer indicating a request to launch a transaction and to switch control for performing the transaction from a client-side web browser to the client-side transaction entry program, the computer network connection data being obtained before receiving the begin transaction message;
set up a connection between the transaction system and the client-side transaction entry program installed on the client-side computer using the computer network connection data enabling the client-side transaction entry program and the transaction system to cooperate in performing the transaction, wherein the transaction system is separate from the interface system and from the client-side computer; and
send a message to the client-side web browser to enable a subsequent transaction to be performed by the client-side web browser in response to receiving information from the transaction system indicating that the transaction has been completed.

18. A non-transitory computer readable medium as in claim 17, wherein the instructions comprise a client part and a server part, wherein the client part is configured for receiving the begin transaction message and the server part is configured for obtaining the computer network connection data and sending the begin transaction message.

19. A non-transitory computer readable medium as in claim 18, wherein the client part comprises a web server, the client-side computer being configured with a client-side web browser configured to communicate with the web server of the client part.

20. A non-transitory computer readable medium as in claim 19, wherein the client part and the server part are connected through an asynchronous channel.

\* \* \* \* \*